(12) United States Patent
Manteiga et al.

(10) Patent No.: US 7,578,134 B2
(45) Date of Patent: Aug. 25, 2009

(54) METHODS AND APPARATUS FOR ASSEMBLING GAS TURBINE ENGINES

(75) Inventors: John Alan Manteiga, North Andover, MA (US); Duane Douglas Thomsen, Lebanon, OH (US); Daniel Dale Brown, Cincinnati, OH (US); John Christopher Brauer, Lawrenceburg, IN (US)

(73) Assignee: General Electric Company, Schenectady, NY (US)

( * ) Notice: Subject to any disclaimer, the term of this patent is extended or adjusted under 35 U.S.C. 154(b) by 745 days.

(21) Appl. No.: 11/329,783

(22) Filed: Jan. 11, 2006

(65) Prior Publication Data
US 2007/0157618 A1    Jul. 12, 2007

(51) Int. Cl.
*F02C 7/20*    (2006.01)
(52) U.S. Cl. .......................................... 60/796; 60/752
(58) Field of Classification Search .................... 60/752, 60/754, 796, 797, 798, 799, 800, 804, 806
See application file for complete search history.

(56) References Cited

U.S. PATENT DOCUMENTS

| 3,186,168 | A | * | 6/1965 | Ormerod et al. ............... 60/796 |
| 3,922,851 | A | | 12/1975 | Irwin |
| 4,176,519 | A | | 12/1979 | Kronogard |
| 4,232,527 | A | | 11/1980 | Reider |
| 4,272,954 | A | | 6/1981 | Kronogard |
| 4,302,941 | A | | 12/1981 | DuBell |
| 4,414,816 | A | | 11/1983 | Craig et al. |
| 4,485,630 | A | | 12/1984 | Kenworthy |
| 4,785,623 | A | | 11/1988 | Reynolds |
| 5,291,732 | A | | 3/1994 | Halila |
| 5,291,733 | A | | 3/1994 | Halila |
| 5,701,733 | A | * | 12/1997 | Lewis et al. ................... 60/796 |
| 6,266,961 | B1 | | 7/2001 | Howell et al. |
| 6,347,508 | B1 | | 2/2002 | Smallwood et al. |
| 6,389,792 | B1 | | 5/2002 | Hagle et al. |
| 6,401,447 | B1 | | 6/2002 | Rice et al. |
| 6,434,821 | B1 | * | 8/2002 | Nelson et al. ............. 29/888.01 |
| 6,543,233 | B2 | | 4/2003 | Young et al. |
| 6,557,349 | B1 | * | 5/2003 | Young et al. ................... 60/752 |
| 6,568,079 | B2 | | 5/2003 | Farmer et al. |

(Continued)

FOREIGN PATENT DOCUMENTS

| GB | 1010338 | 11/1965 |
| GB | 1473866 | 5/1977 |
| GB | 2400650 A | 10/2004 |

OTHER PUBLICATIONS

GB Partial Search Report; Application No. GB0700256.1; Dated May 25, 2007; 3 pgs.
UK Search Report, App. No. GB0700256.1 (Sep. 21, 2007).

*Primary Examiner*—William H Rodriguez
(74) *Attorney, Agent, or Firm*—William Scott Andes, Esq.; Armstrong Teasdale LLP

(57) ABSTRACT

A method for assembling a gas turbine engine is provided. The method includes providing a combustor liner support including a first portion formed with a plurality of circumferentially-spaced recessed areas, and a second portion extending from the first portion. The method also includes coupling the combustor liner support within a combustor such that during engine operations cooling air is channeled through the plurality of recessed areas to facilitate cooling the combustor liner support.

14 Claims, 6 Drawing Sheets

U.S. PATENT DOCUMENTS

| | | |
|---|---|---|
| 6,651,437 B2 | 11/2003 | Farmer et al. |
| 6,668,559 B2 * | 12/2003 | Calvez et al. .................. 60/796 |
| 6,708,495 B2 * | 3/2004 | Calvez et al. .................. 60/753 |
| 6,823,676 B2 * | 11/2004 | Conete et al. .................. 60/796 |
| 6,904,676 B2 | 6/2005 | Emilianowicz |
| 6,988,369 B2 * | 1/2006 | Conete et al. .................. 60/796 |
| 7,017,350 B2 * | 3/2006 | De Sousa et al. .............. 60/796 |
| 7,234,306 B2 * | 6/2007 | Aumont et al. ................ 60/796 |
| 7,237,387 B2 * | 7/2007 | Aumont et al. ................ 60/796 |
| 7,237,388 B2 * | 7/2007 | Aumont et al. ................ 60/796 |
| 2003/0115886 A1 | 6/2003 | Farmer et al. |
| 2004/0011044 A1 * | 1/2004 | Young et al. ................... 60/752 |
| 2004/0103665 A1 | 6/2004 | Farmer et al. |
| 2005/0229606 A1 * | 10/2005 | Bes et al. ....................... 60/804 |
| 2006/0010879 A1 * | 1/2006 | Aumont et al. ................ 60/796 |
| 2006/0021219 A1 | 2/2006 | Caldwell et al. |
| 2007/0044474 A1 * | 3/2007 | Kreder et al. .................. 60/740 |
| 2007/0186558 A1 * | 8/2007 | De Sousa et al. .............. 60/804 |

* cited by examiner

METHODS AND APPARATUS FOR ASSEMBLING GAS TURBINE ENGINES

BACKGROUND OF THE INVENTION

This invention relates generally to gas turbine engines, and more particularly, to combustor liner supports used in gas turbine engines.

At least some known combustors include at least one dome coupled to a combustor liner that defines a combustion zone. More specifically, the combustor liner includes an inner liner and an outer liner that extend from the dome to a turbine nozzle. Each liner is spaced radially inwardly from a combustor casing such that an inner and an outer cooling passageway are defined between each respective liner and the combustor casing. The inner passageway, in particular, enables cooling air to be channeled across an exterior of the inner liner. The cooling air facilitates reducing the temperature of the combustion chamber inner liner to facilitate reducing thermal stresses.

At least some known combustor inner liners are coupled to a forward inner nozzle support via a bolted joint. Such bolted joints, although structurally sound, may limit the useful life expectancy of the combustor liner. For example bolted joints may result in restricting cooling air flow through the inner passageway. As a result, high loss turns, recirculation zones, and/or cooling air backflow may be generated within the inner passageway, which may cause thermal stresses to be induced to the combustor inner liner. Over time, such stresses may decrease the life cycle fatigue (LCF) of the compressor. Moreover, bolted joints may also increase the overall weight of the combustor, which may adversely affect the performance and the life expectancy of the gas turbine engine as a whole.

BRIEF DESCRIPTION OF THE INVENTION

In one aspect, a method for assembling a gas turbine engine is provided. The method includes providing a combustor liner support including a first portion formed with a plurality of circumferentially-spaced recessed areas, and a second portion extending from the first portion. The method also includes coupling the combustor liner support within a combustor such that during engine operations cooling air is channeled through the plurality of recessed areas to facilitate cooling the combustor liner support.

In another aspect, a combustor liner support for a gas turbine engine combustor is provided. The combustor liner support includes a first portion including a plurality of circumferentially-spaced recessed areas and a second portion extending from the first portion for coupling the combustor liner support to a portion of the combustor. The plurality of recessed areas are configured to channel cooling air through the combustor liner support.

In a further aspect, a gas turbine engine is provided. The gas turbine engine includes a nozzle assembly and a combustor assembly coupled upstream from the nozzle assembly. The combustor includes a liner and a liner support, wherein the combustor liner support includes a first portion and a second portion. The first portion includes a plurality of circumferentially-spaced recessed areas configured to channel cooling air through the combustor liner support. The second portion extends from the first portion.

DETAILED DESCRIPTION OF THE INVENTION

Figure 1:
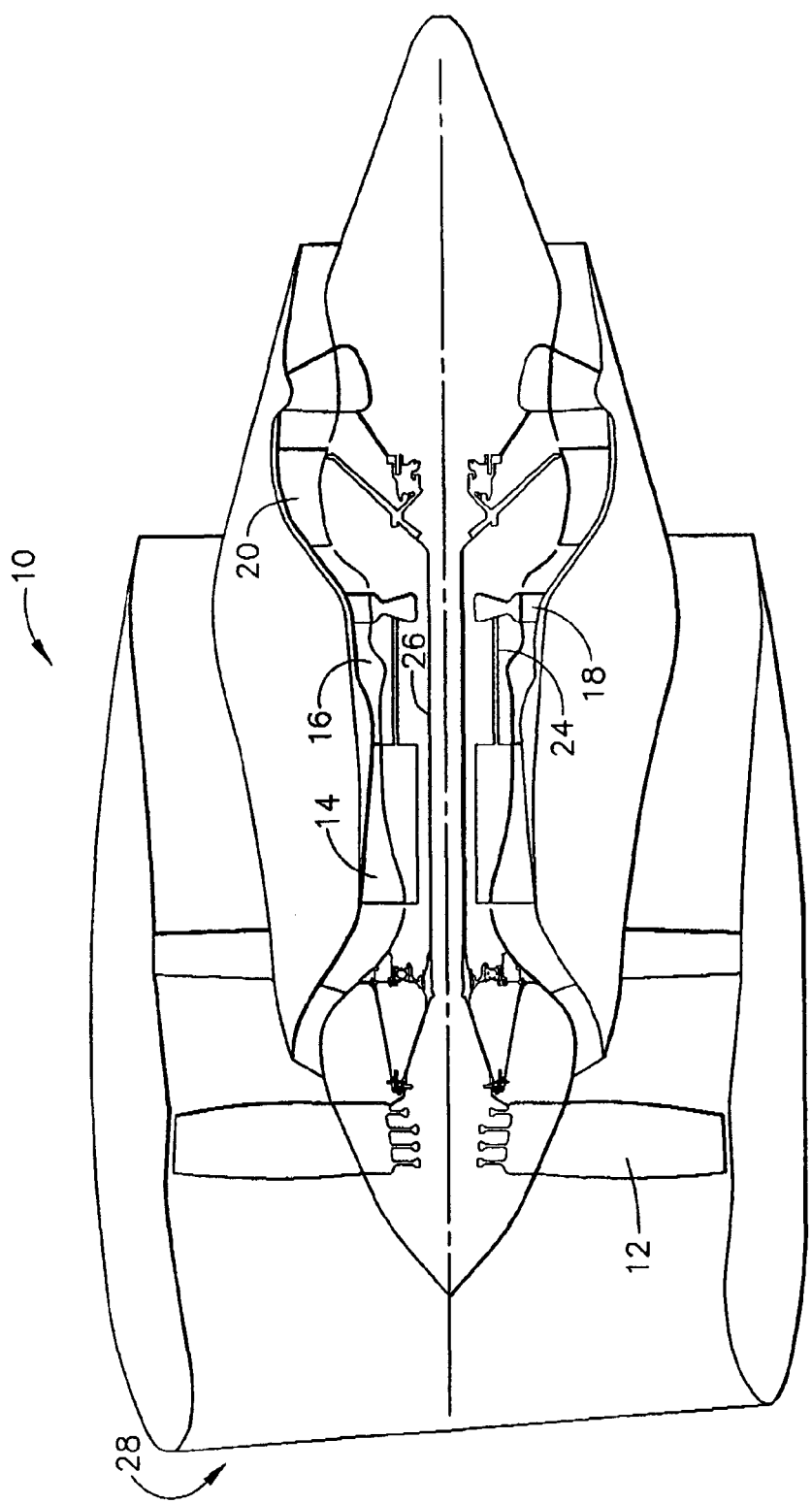
FIG. 1 is a schematic illustration of an exemplary gas turbine engine.

FIG. 1 is a schematic illustration of an exemplary gas turbine engine 10. Engine 10 includes a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 24, and compressor 14 and turbine 18 are coupled by a second shaft 26.

Figure 2:
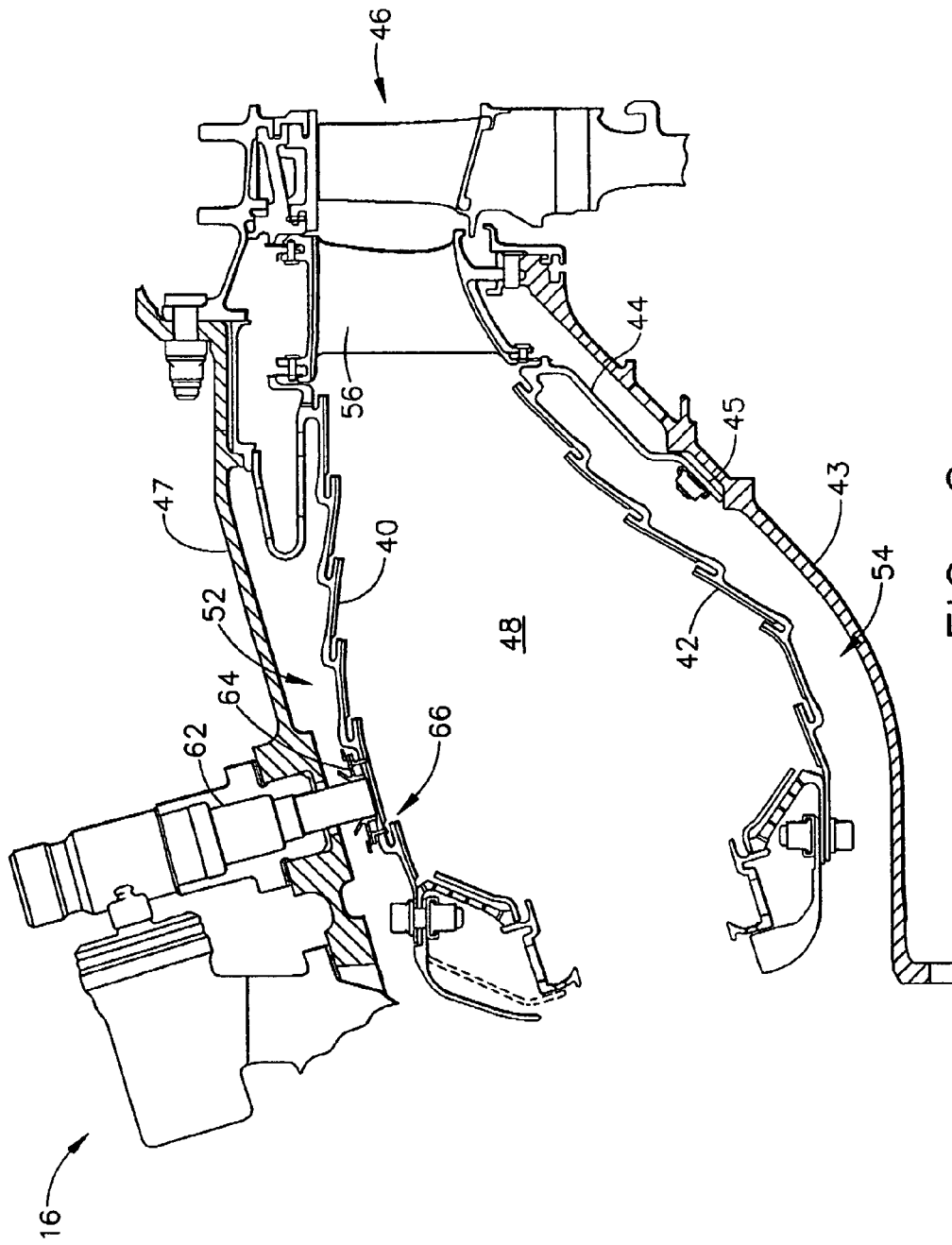
FIG. 2 is a cross-sectional view of an exemplary combustor that may be used with the gas turbine engine shown in FIG. 1.

FIG. 2 is a cross-sectional view of combustor 16 that may be used in gas turbine engine 10. Combustor 16 includes an annular outer liner 40, an annular inner liner 42, and a domed end (not shown) that extends between outer and inner liners 40 and 42, respectively. Inner liner 42 is coupled to a forward inner nozzle support 43 via a combustor inner liner support 44. Forward inner nozzle support 43 is spaced radially inward from inner liner 42. Specifically, in the exemplary embodiment, a plurality of fastener assemblies 45 couple inner liner support 44 substantially flush to forward inner nozzle support 43. More specifically, combustor inner liner support 44 is coupled to inner liner 42 at a downstream end 46 of combustor 16. Outer liner 40 and inner liner 42 are spaced inward from a combustor casing 47 such that a combustion chamber 48 is defined between liners 40 and 42. Outer liner 40 and combustor casing 47 define an outer passageway 52, and inner liner 42 and forward inner nozzle support 43 define an inner passageway 54. Combustion chamber 48 is generally annular in shape and is defined between liners 40 and 42. Outer and inner liners 40 and 42 extend from the domed end, to a turbine nozzle 56 coupled downstream from combustor 16.

A plurality of fuel igniters 62 extend through combustor casing 47 and outer passageway 52, and couple to combustor outer liner 40. Igniters 62 are bluff bodies that are placed circumferentially around combustor 16 and are downstream from the combustor domed end. Each igniter 62 is positioned to ignite a fuel/air mixture within combustion chamber 48, and each includes an igniter tube assembly 64 coupled to combustor outer liner 40. More specifically, each igniter tube assembly 64 is coupled within an opening 66 extending through combustor outer liner 40, such that each igniter tube assembly 64 is concentrically aligned with respect to each opening 66. Igniter tube assemblies 64 facilitate maintaining alignment of each respective igniter 62 relative to combustor 16.

Figure 3:
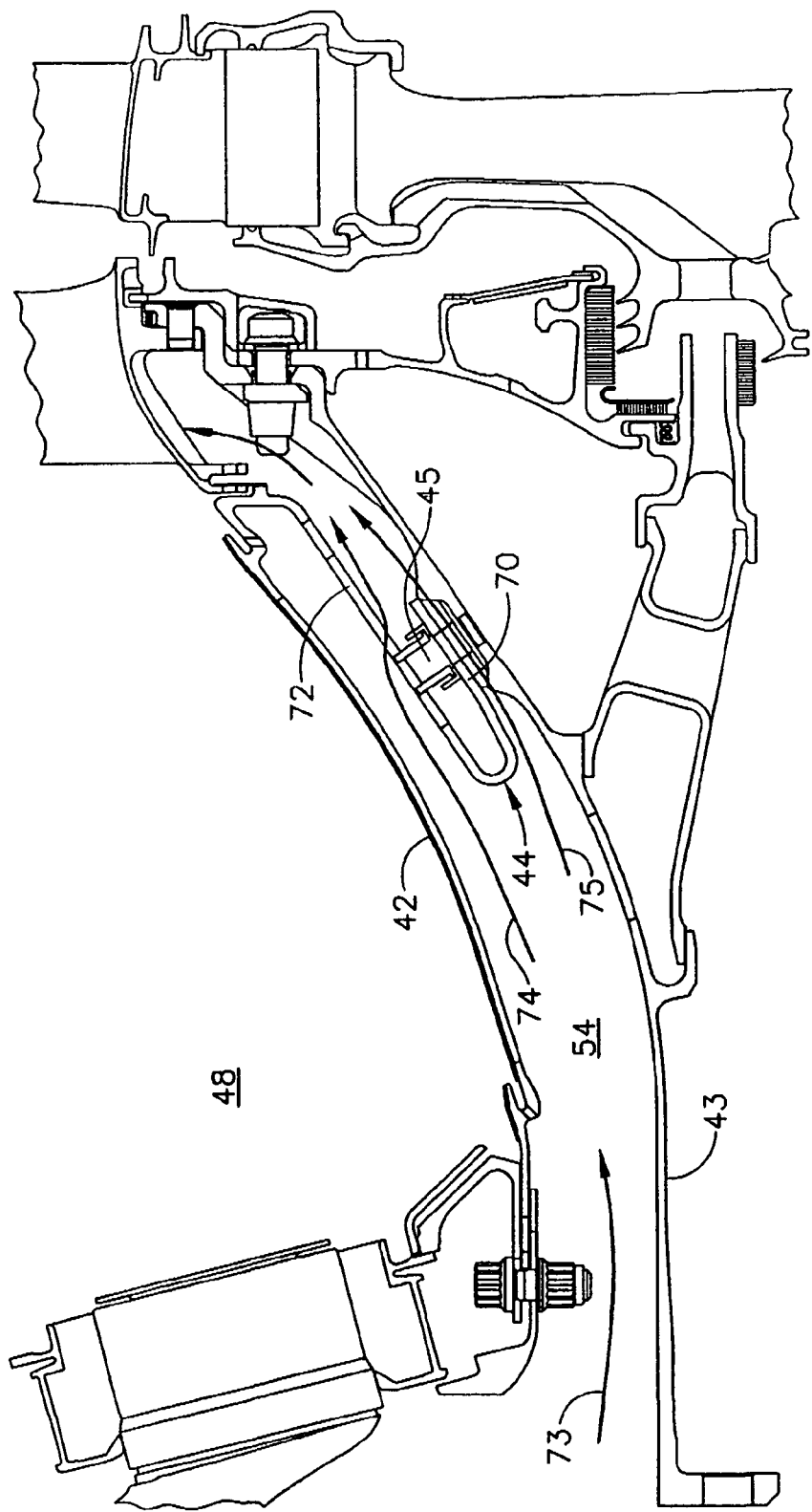
FIG. 3 is a cross-sectional view of a portion of the combustor shown in FIG. 2.

FIG. 3 is an enlarged cross-sectional view of an embodiment of a portion of combustor 16. Specifically, within FIG. 3 inner liner 42 is coupled to forward inner nozzle support 43 via combustor liner support 44. Combustor liner support 44 includes a first portion 70 and a second portion 72. Both portions 70 and 72 are annular and extend substantially circumferentially around forward inner nozzle support 43. Specifically, second portion 72 is coupled to combustor inner liner 42 adjacent combustor downstream end 46. Portion 70 is coupled substantially flush against forward inner nozzle support 43, such that combustor inner liner support 44 is positioned within passageway 54.

To facilitate an adequate flow of cooling air 73 through passageway 54, combustor inner liner support 44 is fabricated with a plurality of passageways (described in more detail with respect to FIG. 4) to enable cooling air 73 to pass through passageway 54 substantially uninhibited. Specifically, as cooling air 73 reaches combustor inner liner support 44, cooling air 73 is divided into an outer flow path 74 and an inner flow path 75. Outer flow path 74 is channeled between combustor inner liner 42 and combustor inner liner support 44. Cooling air 73 within flow path 74 is then channeled through the plurality of liner support passageways and between combustor inner liner support second portion 72 and forward inner nozzle support 43. Inner flow path 75 is channeled through a plurality of passageways defined between adjacent pairs of fastener assemblies 45. Specifically, within flow path 75, cooling air 73 is channeled between combustor inner liner support first portion 70 and combustor inner liner support second portion 72.

Figure 4:
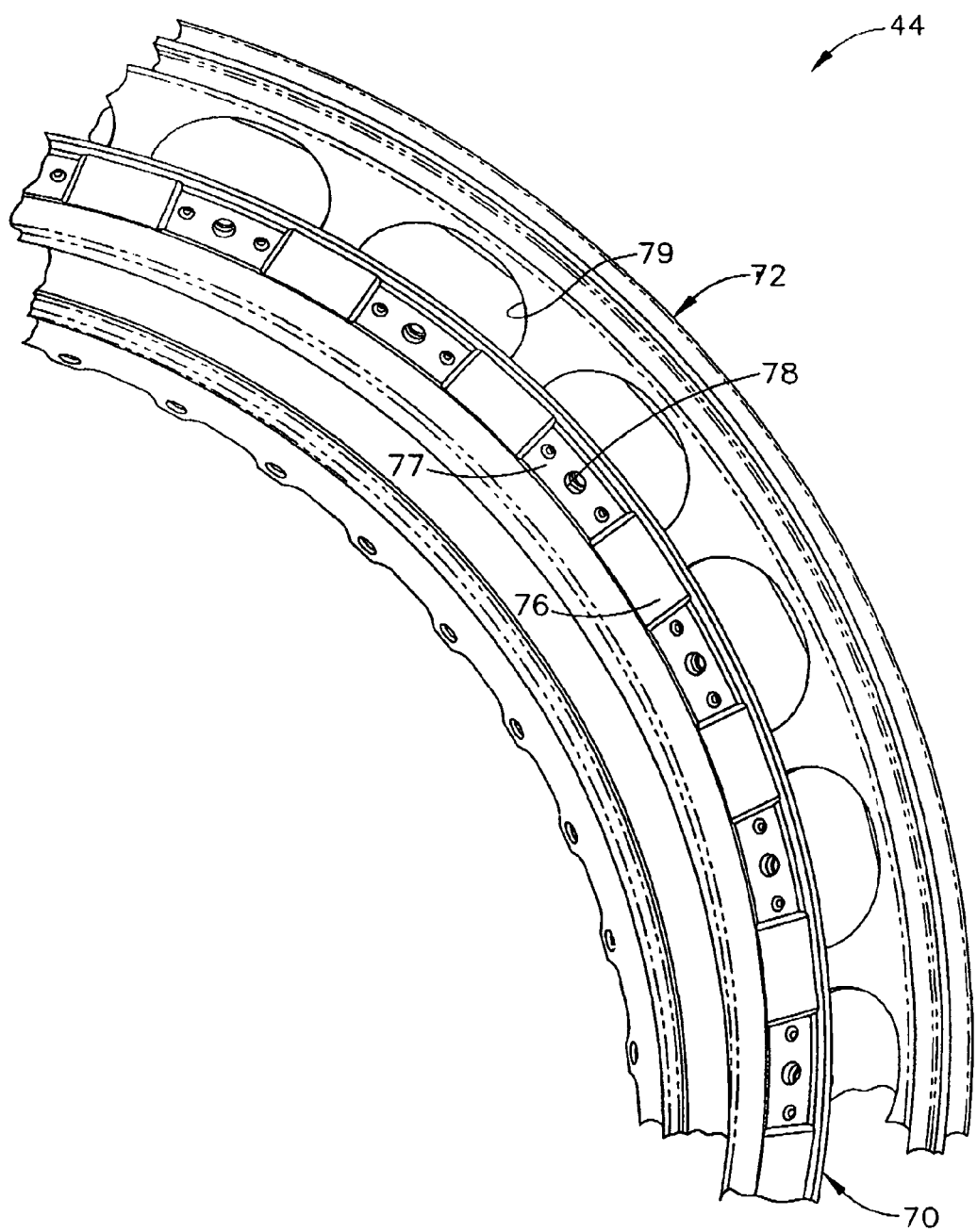
FIG. 4 is a perspective view of an exemplary embodiment of a portion of a combustor liner support that may be used with the combustor shown in FIGS. 2 and 3.
Figure 5:
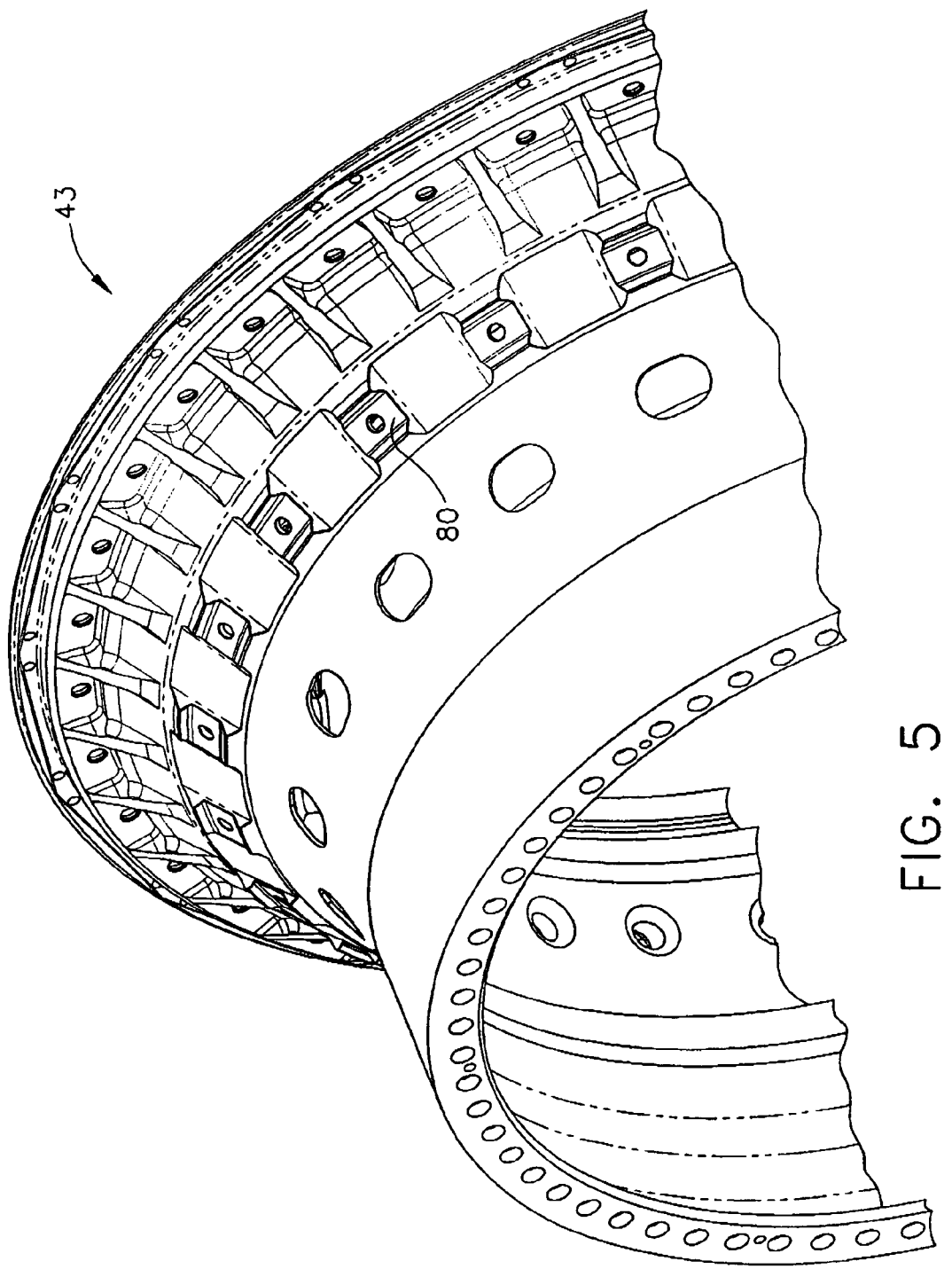
FIG. 5 is a perspective view of a portion of a forward inner nozzle support that may be used with the combustor shown in FIGS. 2 and 3.
Figure 6:
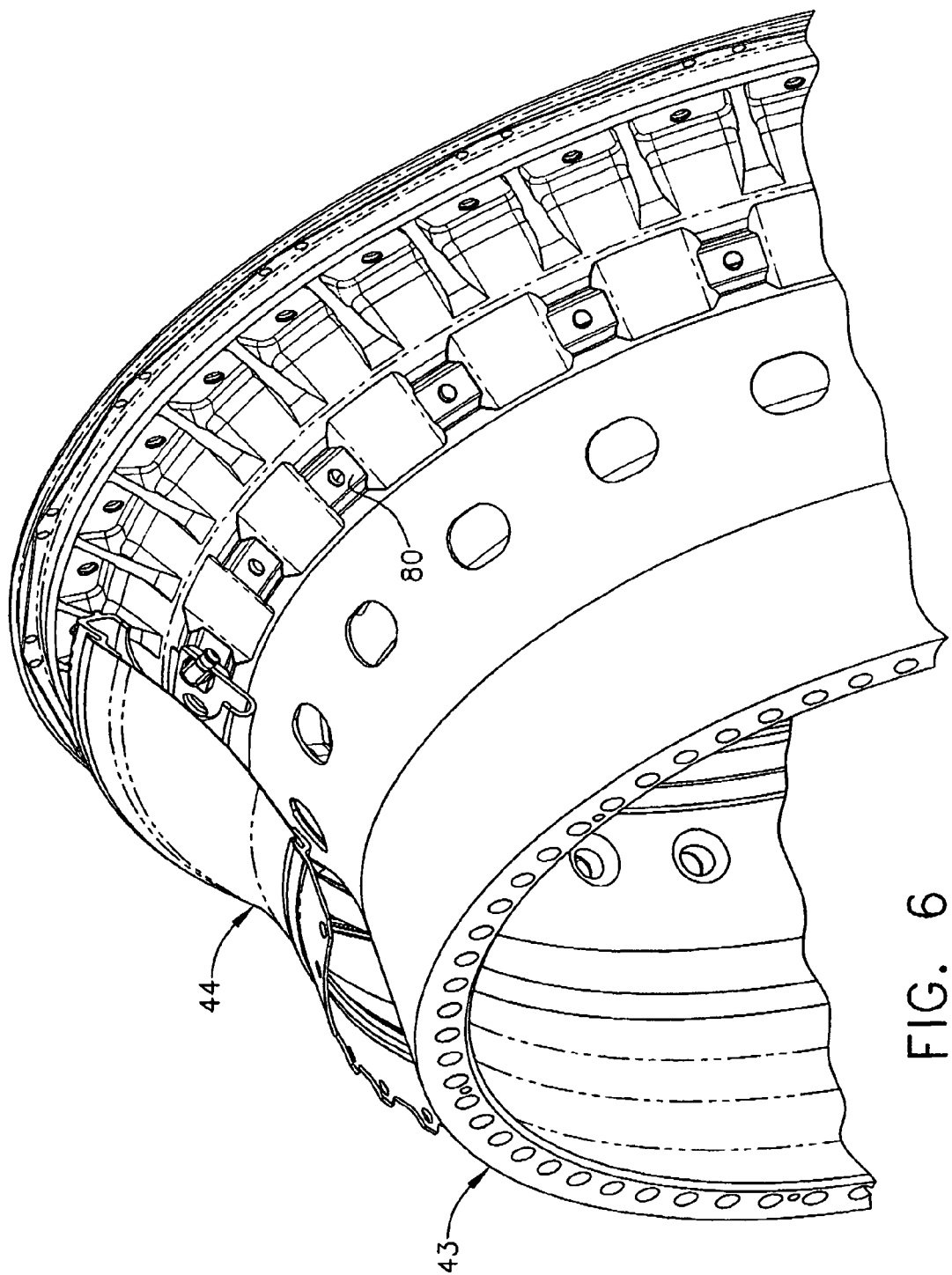
FIG. 6 is a perspective view of the combustor inner liner support shown in FIG. 4, and coupled to the forward inner nozzle support shown in FIG. 5.

FIG. 4 is a perspective view of an exemplary embodiment of a portion of a combustor inner liner support 44 that may be used with gas turbine engine 10 (shown in FIG. 1). FIG. 5 is a perspective view of a portion of a forward inner nozzle support 43 that may be used with gas turbine engine 10 (shown in FIG. 1). FIG. 6 is a perspective view of combustor inner liner support 44 coupled to forward inner nozzle support 43. Liner support first portion 70 is fabricated with a plurality of recessed areas 76 and a plurality of coupling portions 77. Both recessed areas 76 and coupling portions 77 extend circumferentially around first portion 70, and are oriented such that each recessed area 76 is positioned between a pair of coupling portions 77. Recessed areas 76 provide flow path passageways between circumferentially adjacent pairs of fastener assemblies 45 to facilitate air flow along flow path 75 defined between combustor inner liner support first portion 70 and forward inner nozzle support 43. In the exemplary embodiment, each coupling portion 77 includes a plurality of fastener openings 78 sized to receive fastener assemblies therein to enable combustor liner support 44 to be coupled substantially flush against forward inner nozzle support 43.

Liner support second portion 72 is fabricated with a plurality of apertures 79 that are spaced circumferentially about an outer perimeter of second portion 72. More specifically, in the exemplary embodiment each aperture 79 is radially outward from a respective first portion coupling portion 77. Apertures 79 facilitate channeling cooling air 73, along flow path 74, and between combustor inner liner support second portion 72 and forward inner nozzle support 43. Specifically, apertures 79 facilitate directing air flow over fastener assemblies 45.

Forward inner nozzle support 43 is frusto-conical, and includes a plurality of attachment portions 80 spaced circumferentially about its perimeter. Each attachment portion 80 may be coupled to a corresponding combustor inner liner support coupling portion 77. Specifically, each coupling portion 77 and attachment portion 80 is coupled via fastener assemblies 45 to enable combustor inner liner support 44 to couple substantially flush against forward inner nozzle support 43. Accordingly combustor inner liner support 44 is radially outward from, and extends along an outer circumference of forward inner nozzle support 43.

In operation, air flows through low pressure compressor 12 from an upstream side 28 of engine 10. Compressed air is channeled from low pressure compressor 12 to high pressure compressor 14. Compressed air is then delivered to combustor assembly 16 wherein it is mixed with fuel and ignited. Combustion gases are channeled from combustor 16 to drive turbines 18 and 20.

Airflow exits high pressure compressor 14 at a relatively high velocity and is channeled into combustor 16 wherein the airflow is mixed with fuel and the fuel/air mixture is ignited for combustion using igniters 62. As airflow enters combustor 16, cooling air 73 is channeled through combustor inner passageway 54. Airflow in passageway 54 facilitates cooling inner liners 42.

Cooling air 73 is divided at combustor inner liner support 44. Specifically, a first portion of cooling air 73 is directed along outer flow path 74, and a second portion of cooling air 73 is directed along inner flow path 75. Flow path 74 directs cooling air 73 over fastener 45, and between inner liner 42 and combustor inner liner support second portion 72 to facilitate cooling inner liner 42. Furthermore, cooling air 73 flows along inner liner 42 and is channeled through apertures 79 to allow cooling air 73 to flow between combustor inner liner support second portion 72 and forward inner nozzle support 43.

To facilitate preventing air flow restriction in passageway 54, flow path 75 directs cooling air 73 between combustor inner liner support first portion 70 and forward inner nozzle support 43. Specifically, recessed areas 76 define passageways between adjacent pairs of coupling portions 77 and channel cooling air 73 between adjacent coupling portions 77 to facilitate cooling fastener assemblies 45. After passing through recessed areas 76, flow path 75 conjoins with flow path 74 between combustor inner liner support second portion 72 and forward inner nozzle support 43. As such, apertures 79 and recessed areas 76 facilitate providing uninhibited flow of cooling air 73 through inner passageway 54.

The above-described methods and apparatus facilitate allowing uninhibited air flow of cooling air through the combustor. Specifically air flow through the recessed areas defined in the combustor inner liner support facilitate preventing high loss turns, recirculation zones, and/or cooling air backflow within the inner passageway of the combustor. Accordingly, the recessed areas facilitate reducing thermal stresses on the combustor inner liner, and also facilitate increasing life cycle fatigue and improving the life span of the gas turbine engine.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Although the methods and systems described herein are described in the context of fabricating a combustor inner liner support of a gas turbine engine, it is understood that the methods and systems described herein are not limited to combustor inner liner supports or gas turbine engines. Likewise, the combustor inner liner support components illustrated are not limited to the specific embodiments described herein, but rather, components of the combustor inner liner support can be utilized independently and separately from other components described herein.

While the invention has been described in terms of various specific embodiments, those skilled in the art will recognize that the invention can be practiced with modification within the spirit and scope of the claims.

What is claimed is:

1. A method for assembling a gas turbine engine, said method comprising:

providing a combustor liner support including a first portion formed with a plurality of circumferentially-spaced recessed surfaces positioned between a pair of circumferentially-adjacent coupling portions, and a second portion extending from the first portion and formed with a plurality of circumferentially-spaced apertures to facilitate channeling cooling air through the plurality of apertures during engine operations; and coupling the combustor liner support within a combustor, the combustor including an inner liner that defines a combustion chamber and an inner nozzle support spaced apart from the inner liner, the combustor liner support disposed between the inner liner and the inner nozzle support such that during engine operations cooling air is channeled between the inner nozzle support and the combustor liner support via the plurality of recessed surfaces to facilitate cooling the combustor liner support.

2. A method in accordance with claim 1 wherein providing a combustor liner support further comprises providing a combustor liner support wherein the combustor liner support second portion is radially outward from the combustor liner support first portion to facilitate enabling cooling air discharged from the plurality of apertures to cool the plurality of coupling portions during engine operations.

3. A method in accordance with claim 1 further comprising coupling the combustor liner support first portion to a turbine engine nozzle such that the recessed surfaces channel cooling air towards the turbine engine nozzle during engine operations.

4. A method in accordance with claim 3 further comprising coupling the combustor liner support within the combustor to facilitate channeling cooling air between the combustor liner support and the turbine engine nozzle.

5. A method in accordance with claim 1 further comprising coupling the combustor liner support second portion to the inner liner such that the recessed surfaces channel cooling air between the combustor liner support and the inner liner during engine operations.

6. A combustor liner support for a gas turbine engine combustor, the combustor including an inner liner that defines a combustion chamber and an inner nozzle support spaced apart from the inner liner, said combustor liner support comprising a first portion comprising a plurality of circumferentially-spaced recessed surfaces positioned between a pair of said circumferentially-adjacent coupling portions and a second portion comprising a plurality of circumferentially-spaced apertures and extending from said first portion for coupling said combustor liner support to a portion of the combustor between the inner liner and the inner nozzle support such that said plurality of recessed surfaces and said plurality of apertures facilitate channeling cooling air-between the inner nozzle support and said combustor liner support.

7. A combustor liner support in accordance with claim 6 wherein said combustor liner support second portion is radially outward from said combustor liner support first portion, said plurality of apertures configured to enable cooling air discharged from said apertures to cool said plurality of coupling portions.

8. A combustor liner support in accordance with claim 7 wherein said combustor liner support second portion is configured to couple said combustor liner support to the inner liner, said plurality of apertures configured to channel cooling air between said combustor liner support second portion and the inner liner.

9. A combustor liner support in accordance with claim 6 wherein said combustor liner support first portion is configured to couple said combustor liner support to a turbine engine nozzle downstream from the combustor, said recessed surfaces configured to channel cooling air towards the turbine engine nozzle.

10. A combustor liner support in accordance with claim 9 wherein said plurality of recessed surfaces are configured to channel cooling air between said combustor liner support first portion and the turbine engine nozzle.

11. A gas turbine engine comprising:

a nozzle assembly; and a combustor assembly coupled upstream from said nozzle assembly, said combustor assembly comprising an inner liner that defines a combustion chamber and an combustor liner support spaced apart from said inner liner, said combustor liner support disposed between said inner liner and said inner nozzle support, said combustor liner support comprising a first portion and a second portion, said first portion comprising a plurality of circumferentially-spaced recessed surfaces each positioned between a pair of circumferentially-adjacent coupling portions and configured to channel cooling air between said inner nozzle support and said combustor liner support during operations of said gas turbine engine to facilitate cooling said combustor liner support, said combustor liner support second portion is radially outward from said combustor liner support first portion, and said combustor liner support second portion further comprises a plurality of circumferentially-spaced apertures, said plurality of apertures configured to enable cooling air discharged from said apertures to cool said plurality of coupling portions.

12. A gas turbine engine in accordance with claim 11 wherein said combustor liner support second portion is configured to couple said combustor liner support to said inner liner, said plurality of apertures configured to channel cooling air between said combustor liner support second portion and said inner liner.

13. A gas turbine engine in accordance with claim 11 wherein said combustor liner support first portion is configured to couple said combustor liner support to said nozzle assembly, said recessed surfaces configured to channel cooling air towards said nozzle assembly.

14. A gas turbine engine in accordance with claim 13 wherein said plurality of coupling portions are configured to channel cooling air between said combustor liner support first portion and said nozzle assembly.

* * * * *

UNITED STATES PATENT AND TRADEMARK OFFICE
CERTIFICATE OF CORRECTION

PATENT NO. : 7,578,134 B2　　　　　　　　　　　　　　　　　　　　　　　　　Page 1 of 1
APPLICATION NO. : 11/329783
DATED : August 25, 2009
INVENTOR(S) : Manteiga et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 898 days.

Signed and Sealed this

Seventh Day of September, 2010

David J. Kappos
*Director of the United States Patent and Trademark Office*